(12) United States Patent
Takamatsu

(10) Patent No.: US 8,465,311 B2
(45) Date of Patent: Jun. 18, 2013

(54) CONNECTION DEVICE

(75) Inventor: Michihiro Takamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/234,554

(22) Filed: Sep. 16, 2011

(65) Prior Publication Data

US 2012/0071019 A1    Mar. 22, 2012

(30) Foreign Application Priority Data

Sep. 21, 2010   (JP) .................................. 2010-211330

(51) Int. Cl.
*H01R 13/24*     (2006.01)
(52) U.S. Cl.
USPC .......................................................... 439/247
(58) Field of Classification Search
USPC .................................. 439/246–248
See application file for complete search history.

(56) References Cited

U.S. PATENT DOCUMENTS

| | | | |
|---|---|---|---|
| 4,815,986 A * | 3/1989 | Dholoo ......................... | 439/248 |
| 5,167,520 A * | 12/1992 | Henry et al. .................. | 439/266 |
| 5,397,244 A * | 3/1995 | Generoli et al. .............. | 439/248 |
| 5,769,652 A * | 6/1998 | Wider ........................... | 439/248 |
| 6,558,177 B2 * | 5/2003 | Havener et al. ............... | 439/246 |
| 7,422,456 B1 * | 9/2008 | Mitani et al. .................. | 439/248 |
| 7,607,929 B1 * | 10/2009 | Nguyen et al. ................ | 439/246 |
| 7,922,529 B1 * | 4/2011 | Meurer ......................... | 439/578 |
| 8,029,323 B2 * | 10/2011 | Wavering ...................... | 439/700 |
| 8,231,398 B2 * | 7/2012 | Rosenberger ................. | 439/247 |
| 2006/0073723 A1 * | 4/2006 | Cowgill et al. ............... | 439/247 |
| 2008/0214040 A1 * | 9/2008 | Holterhoff et al. ........... | 439/352 |
| 2009/0097799 A1 | 4/2009 | Sakurai et al. | |
| 2009/0305542 A1 | 12/2009 | Masuzaki | |

FOREIGN PATENT DOCUMENTS

| | | |
|---|---|---|
| JP | 2009-109578 | 5/2009 |
| JP | 2009-294343 | 12/2009 |

\* cited by examiner

*Primary Examiner* — Gary F. Paumen
(74) *Attorney, Agent, or Firm* — Staas & Halsey LLP

(57) ABSTRACT

A connection device includes an adapter that covers a connection target that is connected to a connector, where the adapter is secured to a connection apparatus that is provided with the connection target. The connection device includes a housing that has a cylindrical portion that holds the connector such that the connector is movable relative to the cylindrical portion in an axial direction, where the cylindrical portion is engaged with the adapter such that the connector is connected to the connection target, and a first spring that urges the connector toward the connection target.

8 Claims, 16 Drawing Sheets

FIG. 1
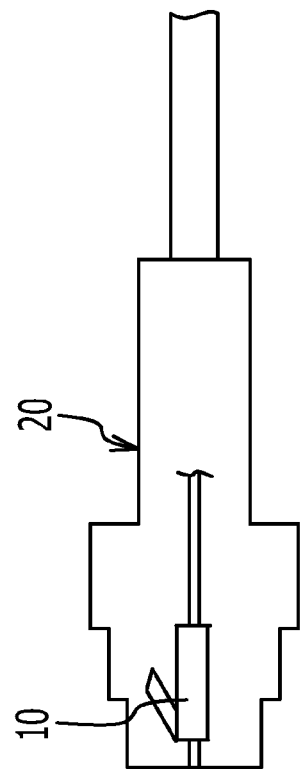
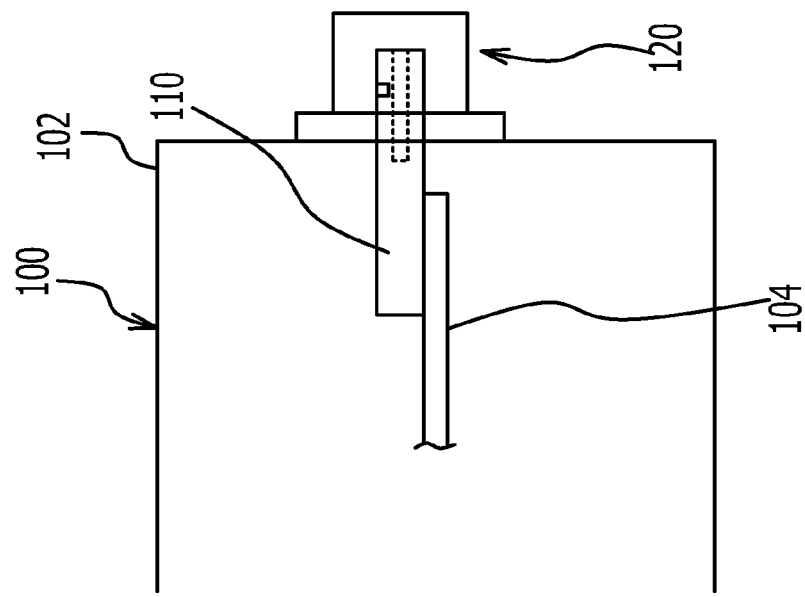

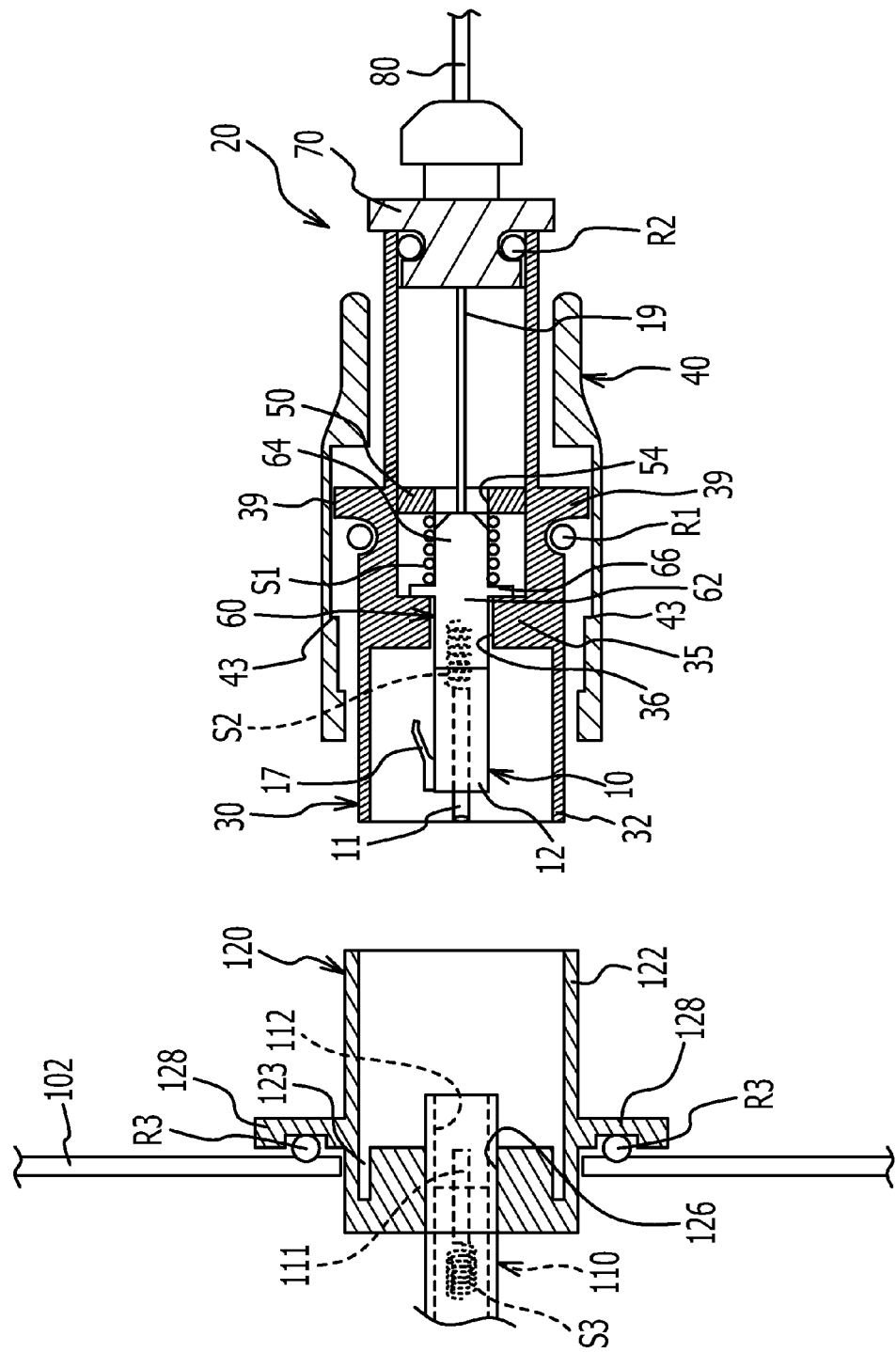

CONNECTION DEVICE

CROSS-REFERENCE TO RELATED APPLICATIONS

This application is based upon and claims the benefit of priority from the prior Japanese Patent Application No. 2010-211330 filed on Sep. 21, 2010, the entire contents of which are incorporated herein by reference.

FIELD

The embodiments discussed herein relate to a connection device that connects a plurality of components to each other.

BACKGROUND

Typical connection structures that prevent portions connecting connectors to connection targets from becoming wet with water are known. One such example is a structure in which a housing that holds a connector is engaged with an adapter that is secured to a connection apparatus including a connection target so as to cover the connection target. With this structure, the connector is connectible to the connection target while ensuring that waterproofness is maintained. Japanese Laid-open Patent Publication No. 2009-109578 and No. 2009-294343 discuss a typical waterproof technology as described above. The length of the connection target in the axial direction of the connector may vary depending on the type of the connection target, and the position of the connection portion where the connector and the connection target are connected to each other may vary depending on the type of the connection target. In a connection as described above, separate types of connection components are typically prepared corresponding to the types of the connection targets.

SUMMARY

According to an embodiment, a connection device includes an adapter that covers a connection target that is connected to a connector, where the adapter is secured to a connection apparatus that is provided with the connection target. The connection device of an embodiment includes a housing that has a cylindrical portion that holds the connector such that the connector is movable relative to the cylindrical portion in an axial direction, where the cylindrical portion is engaged with the adapter such that the connector is connected to the connection target, and a first spring that urges the connector toward the connection target.

Objects and advantages of the invention will be realized and achieved by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 illustrates a waterproof device according to an embodiment having a connection structure for which waterproofness is considered.

FIG. 4 illustrates an internal structure of a housing and an adapter.

DETAILED DESCRIPTION

Figure 2:
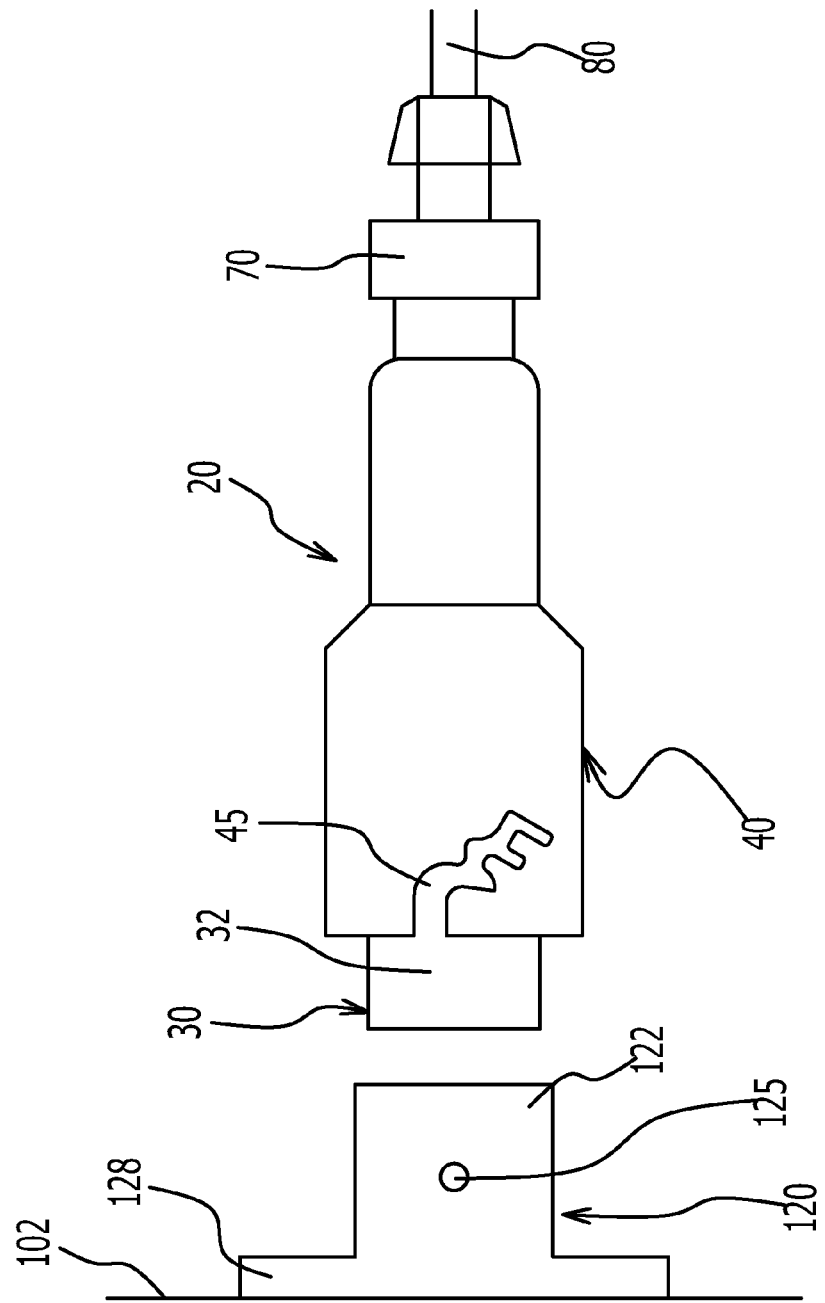
FIG. 2 is an enlarged view of a waterproof device.

Reference will now be made in detail to the embodiments, examples of which are illustrated in the accompanying drawings, wherein like reference numerals refer to the like elements throughout. The embodiments are described below to explain the present invention by referring to the figures.

FIG. 1 illustrates a waterproof device according to an embodiment having a connection structure for which waterproofness is considered.

The waterproof structure includes a connection apparatus 100, an optical connector 10, and the waterproof device. The connection apparatus 100 holds an optical module 110, the optical connector 10 is connectible to the optical module 110, and the waterproof device prevents a connection portion connecting the optical connector 10 to the optical module 110 from becoming wet by water. Examples of the connection apparatus 100 include but are not limited to an optical transceiver apparatus used in a cellular base station. While specific examples of a connection apparatus are provided herein, the present invention is not limited to any particular apparatus and may be implemented with (as) a connector attached to an equipment and used for connection with other equipments. Although the connection apparatus 100 is designed for outdoor use, it may be a device that is used indoor. The connection apparatus 100 includes an enclosure 102. The enclosure 102 holds a printed circuit board 104 therein. The optical module 110 is mounted on the printed circuit board 104. Examples of the optical module 110 include but are not limited to a multi-source agreement interface module such as a gigabit interface converter (GBIC) or a small form-factor pluggable module (SFP). The optical module 110 is replaceable. There are a plurality of types of optical modules 110 depending on, for example, the wavelength of transmitted light and the transmission distance. The length of the optical module 110 in the axial direction varies depending on the type. Here, the axial direction refers to a direction in which the optical connector 10 is inserted into the optical module 110, and a direction the same as the axial direction of the optical connector 10.

The waterproof device includes a housing 20 and an adapter 120. The housing 20 holds the optical connector 10. The adapter 120 is secured to the enclosure 102 so as to cover a portion of the optical module 110 that protrudes out of the enclosure 102. The housing 20 and the adapter 120 are formed of, for example, metal or synthetic resin, or may be formed of another material. The waterproof device may also be referred to as a connection device herein. Further, although FIG. 1 is illustrated as having different components in addition to the housing 20 and the adapter 120, the present invention is not limited to the components as shown therein. For example, an embodiment of the waterproof device (connection device) may incorporate some elements into a single element.

Figure 3A:
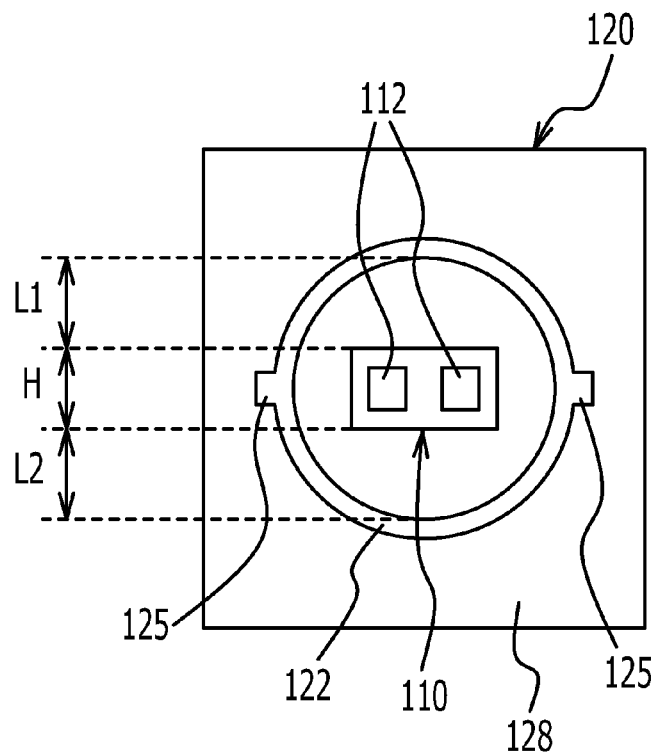
FIG. 3A is a front view of an adapter.
Figure 3B:
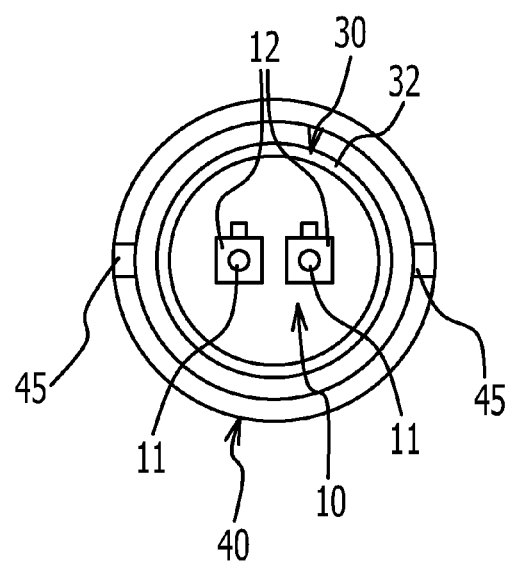
FIG. 3B is a front view of a housing.

FIG. 2 is an enlarged view of a waterproof device. FIG. 3A is a front view of the adapter 120. FIG. 3B is a front view of the housing 20.

The housing 20 includes a cylindrical portion 30, an outer cylindrical portion 40, a connection member 70, and a cable 80. According to an embodiment, the connection member 70 is provided on a base end side of the outer cylindrical portion 40, and the cable 80 is connected with the base end of the connection member 70. The outer cylindrical portion 40 is positioned radially outside the cylindrical portion 30 so as to cover the cylindrical portion 30. Both the cylindrical portion 30 and the outer cylindrical portion 40 have a cylindrical shape. The connecting end of the cylindrical portion 30 protrudes from the connecting end of the outer cylindrical portion 40 toward the connecting end side in the axial direction. The outer cylindrical portion 40 has groove portions 45 formed therein. The details of the groove portions 45 are described in detail below.

The adapter 120 has a planar base portion 128 and an engagement portion 122. The base portion 128 is secured to a wall surface of the enclosure 102, and the engagement portion 122 extends in a direction perpendicular to the enclosure 102. The engagement portion 122 has a cylindrical shape. Protrusion portions 125 are provided on an outer peripheral surface of the engagement portion 122. The protrusion portions 125 are engageable with the groove portions 45. As illustrated in FIGS. 3A and 3B, the two protrusion portions 125 are disposed on the outer peripheral surface of the engagement portion 122. Likewise, the two groove portions 45 are formed in the outer cylindrical portion 40. The two protrusion portions 125 are respectively disposed at positions that are rotated through 180-degree relative to each other about the central axis of the engagement portion 122. Likewise, the two groove portions 45 are respectively formed at positions that are rotated through 180-degree relative to each other about the central axis of the outer cylindrical portion 40. The two groove portions 45 have respective shapes that are inverted relative to each other.

FIG. 4 illustrates the internal structure of the housing 20 and the adapter 120.

The cylindrical portion 30 has an engagement portion 32 at a connecting end portion thereof. The engagement portion 32 has a cylindrical shape. In the engagement portion 32, a support portion 35 that supports the optical connector 10 is formed such that the optical connector 10 is movable relative to the support portion 35 in the axial direction. The support portion 35 has a through hole 36 formed therein into which an attachment member 60 that is attached to the optical connector 10 is inserted. The through hole 36 has a substantially rectangular shape seen from the axial direction. The optical connector 10 includes main body portions 12. The attachment member 60 is attached to the base end portions of the main body portions 12. The attachment member 60 has holes through which optical fiber cables 19 pass. This arrangement is described in detail below. The attachment member 60 has a body portion 62, base end portions 64, and a flange portion 66 that is disposed between the body portion 62 and the base end portions 64. According to an embodiment, the base end portions 64 are smaller than the body portion 62 in a section taken along a direction perpendicular to the axial direction. However, the shape of the base end portions 64 is not limited to this. The body portion 62 is inserted through the through hole 36. The through hole 36 restricts the movement of the attachment member 60 in a planar direction perpendicular to the axial direction. This restricts the movement of the optical connector 10 in a planar direction perpendicular to the axial direction.

A partition 50 is secured at a position in the cylindrical portion 30 closer to the base end than the support portion 35. The partition 50 has through holes 54 formed therein through which the optical fiber cables 19 pass. Although details are described below, each through hole 54 has a sufficiently large size so as to allow the corresponding one of the base end portions 64 to be inserted thereinto. Coil-shaped springs S1 are provided between the partition 50 and the flange portion 66. The base end portions 64 are inserted into the respective coil-shaped springs S1. Urging force of the springs S1 urges the attachment member 60 toward the connecting end in the axial direction. By doing this, the optical connector 10 is urged toward the connecting end in the axial direction.

The cylindrical portion 30 is provided with a ring member R1. The cylindrical portion 30 has a sliding portion 39 formed thereon. The sliding portion 39 is a portion where the diameter of the outer periphery is the maximum in the cylindrical portion 30. By setting the sliding portion 39 and an inner surface of the outer cylindrical portion 40 to be slidable relative to each other, the outer cylindrical portion 40 is rotatable relative to the cylindrical portion 30 about the axial direction. The ring member R1 is disposed in a recess of the cylindrical portion 30 such that the ring member R1 does not block the rotation of the outer cylindrical portion 40 relative to the cylindrical portion 30. The ring member R1 has a ring shape and is formed of rubber. The outer cylindrical portion 40 is movable relative to the cylindrical portion 30 within a specified range in the axial direction. The outer cylindrical portion 40 has a contact portion 43 that contacts the ring member R1 so as to restrict the movement of the outer cylindrical portion 40 in the axial direction.

The connection member 70 is connected to the cylindrical portion 30 on the base end side of the cylindrical portion 30. The cylindrical portion 30 is connected to the connection member 70 such that the cylindrical portion 30 is not rotatable relative to the connection member 70 about the axial direction. A ring member R2 is provided between the connection member 70 and the cylindrical portion 30. The ring member R2 has a ring shape and is formed of rubber. The ring member R2 is provided in order to prevent penetration of water through a gap between the cylindrical portion 30 and the connection member 70. The cable 80 is connected to the base end of the connection member 70. The optical fiber cables 19 are inserted into the cable 80.

The optical connector 10 includes ferrules 11, springs S2 that urge the ferrules 11 toward the connecting end in the axial direction, and the main body portions 12 that hold the respective ferrules 11 and the springs S2 and are provided with respective latch arms 17. The latch arms 17 are maintained in a position inclined relative to the main body portions 12. The optical fiber cables 19 are connected to the base end of the main body portions 12. The ferrules 11 are connected to optical fibers inside the main body portions 12. The optical fiber cables 19 include the optical fibers wired therethrough.

The adapter 120 is engaged with a hole portion formed in the enclosure 102. The adapter 120 has the engagement portion 122 that is engageable with the cylindrical portion 30. The engagement portion 122 has a circle-shaped engagement groove portion 123 formed on the base end side thereof. The engagement groove portion 123 is continuous with an inner surface of the engagement portion 122. The adapter 120 has a through hole 126 formed therein. The optical module 110 is inserted through the through hole 126. The connecting end portion of the optical module 110 protrudes from the through hole 126. A ring member R3 is provided between the base portion 128 and the enclosure 102. The ring member R3 is provided in order to prevent penetration of water into the enclosure 102 through a gap between the base portion 128 and the enclosure 102. The ring member R3 has a ring shape and is formed of rubber.

The optical module 110 has an insertion holes 112 into which the optical connector 10 is inserted. Ferrules 111, which are connected to the ferrules 11 of the optical connector 10, are provided in the insertion holes 112. Springs S3 urge the ferrules 111 toward the connecting end in the axial direction.

Figure 5A:
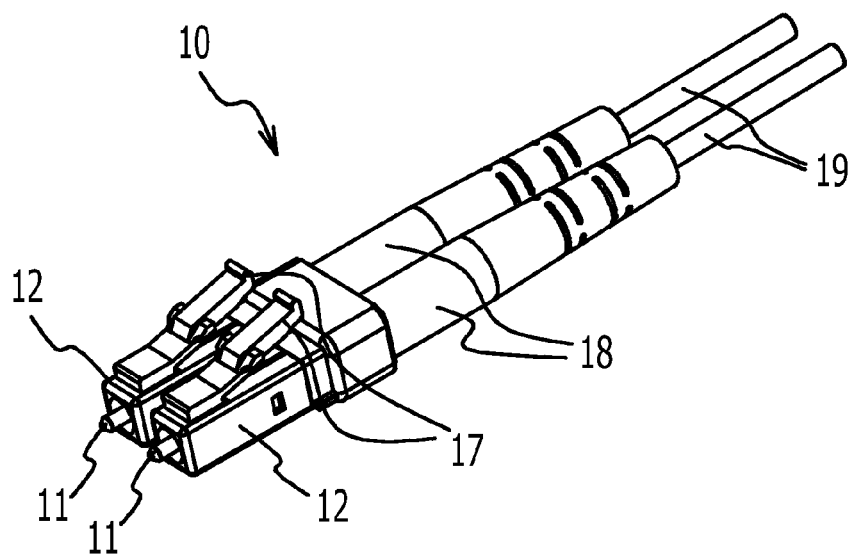
FIG. 5A is a perspective view of an optical connector.
Figure 5B:
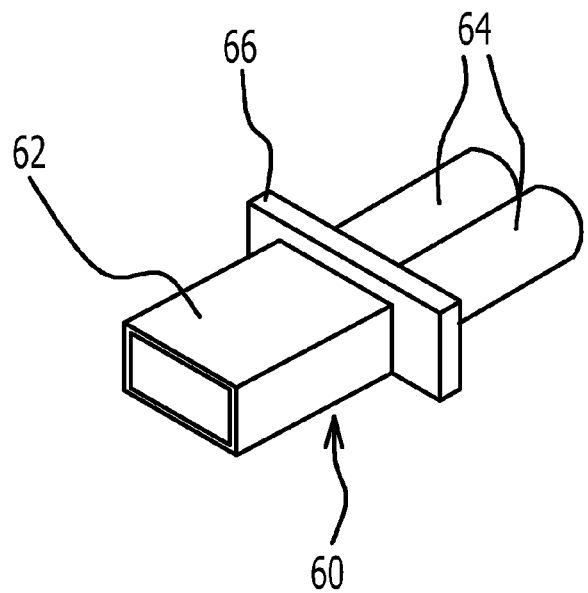
FIG. 5B is a perspective view of an attachment member.

FIG. 5A is a perspective view of the optical connector 10. FIG. 5B is a perspective view of the attachment member 60. The optical connector 10, for example, is a duplex lucent connector (LC) type optical connector. The optical connector 10 is provided with the two ferrules 11, the two main body portions 12, the two latch arms 17, two boots 18, which are each secured to the base end of the main body portion 12, and the two optical fiber cables 19. The boots 18 have an elastic property and protect the optical fibers. The optical fiber cables 19 are inserted through the boots 18. The optical fibers are disposed inside the optical fiber cables 19. The main body portions 12 are provided with the springs S2 that urge the ferrules 11 toward the connecting end in the axial direction. The optical connector 10 illustrated in FIG. 5A is in a state before the attachment member 60 is attached thereto.

The attachment member 60 illustrated in FIG. 5B is attached to the two main body portions 12 on the base end side of the main body portions 12. The attachment member 60 is attached so as to cover the boots 18. The body portion 62 has a substantially box shape. The body portion 62 is inserted into the substantially square-shaped through hole 36 (FIG. 4). The two boots 18 are inserted through the body portion 62. The two base end portions 64 are arranged parallel to each other. The boots 18 are each inserted into the corresponding one of the two base end portions 64. Each of the base end portions 64 has a substantially cylindrical shape. The two springs S1 are each provided so as to be coiled around the corresponding one of the two base end portions 64. The flange portion 66 has a substantially frame shape.

Figure 6:
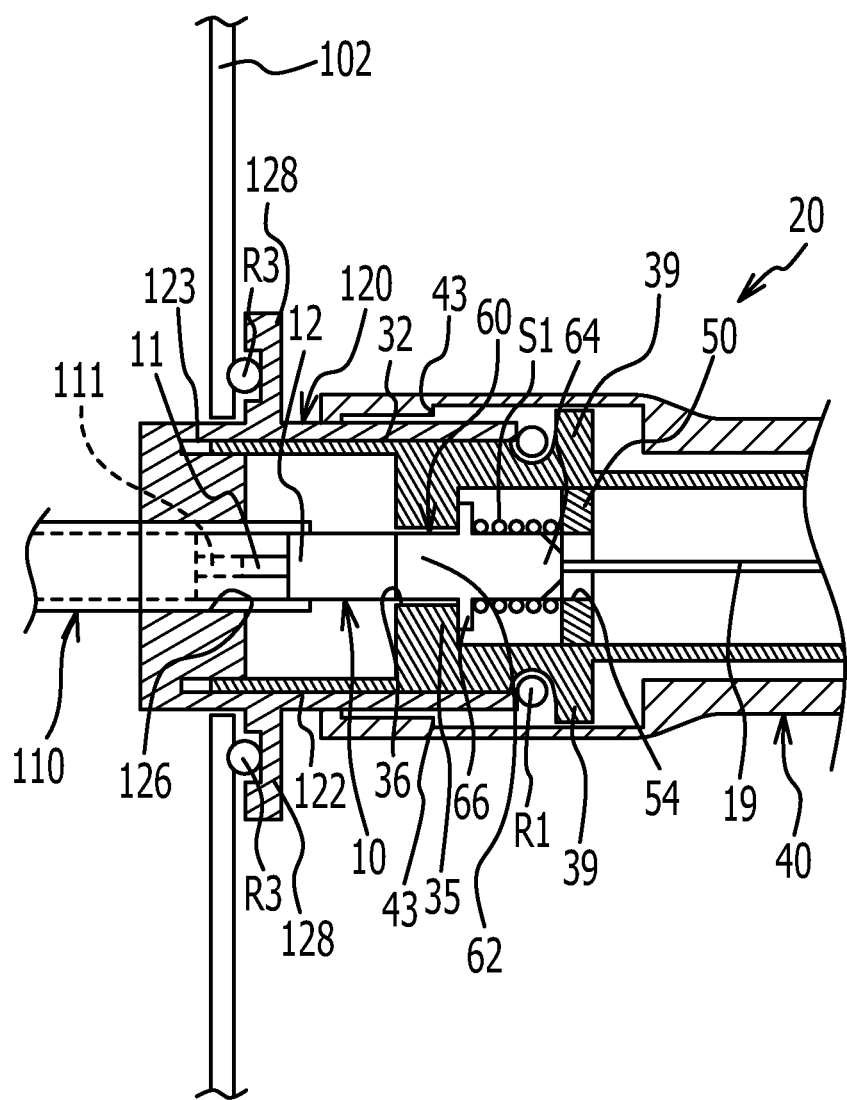
FIG. 6 illustrates engagement of an adapter with a housing.
Figure 7:
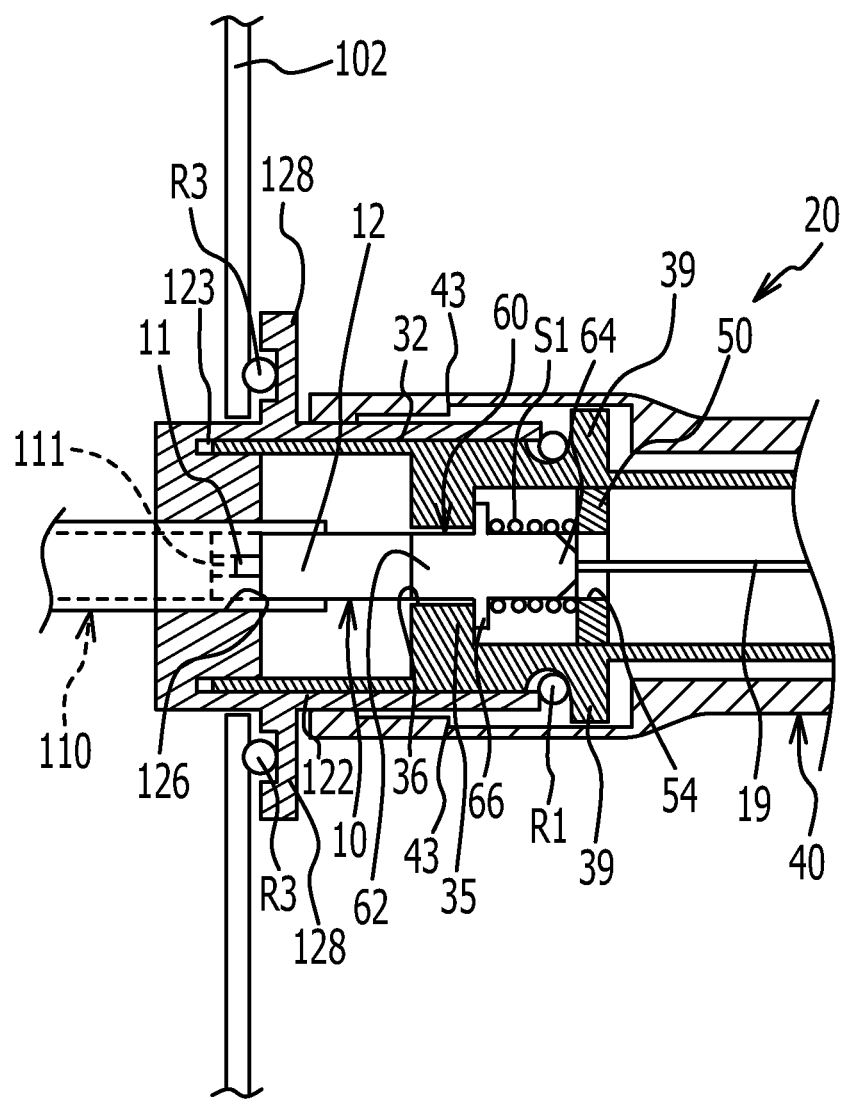
FIG. 7 illustrates engagement of an adapter with a housing.
Figure 8:
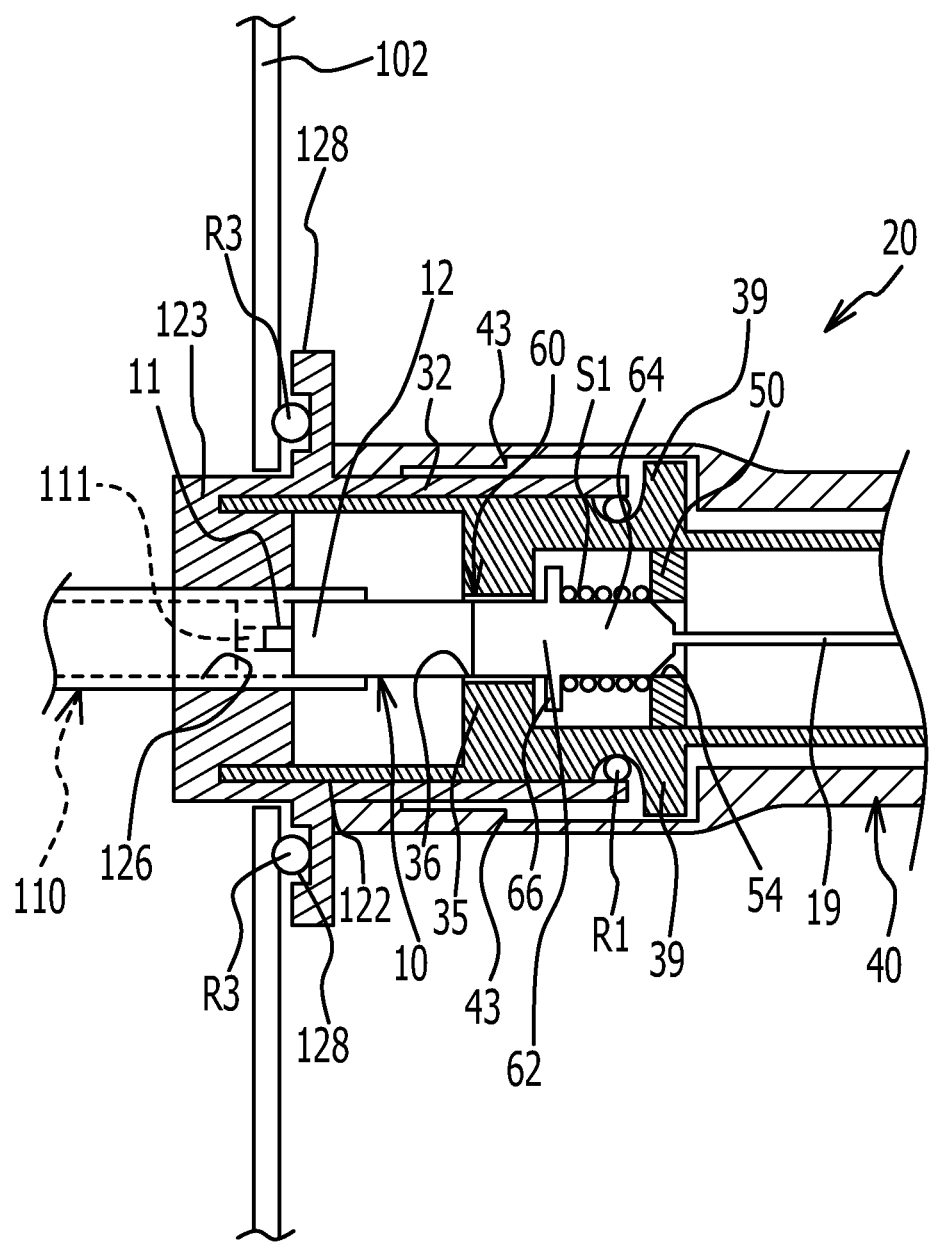
FIG. 8 illustrates engagement of an adapter with a housing.

FIGS. 6 to 8 illustrate engagement of the adapter 120 with the housing 20.

When the housing 20 is engaged with the adapter 120, the engagement portion 122 is inserted between the outer cylindrical portion 40 and the cylindrical portion 30. The engagement portion 32 is inserted into the engagement groove portion 123. FIG. 6 illustrates a state in which the ferrules 11 and the ferrules 111 are in contact with each other. When the housing 20 is further pushed to the adapter 120, the ferrules 11 move toward the base end in the axial direction against the urging force of the springs S2 as illustrated in FIG. 7. Likewise, the ferrules 111 move toward the base end in the axial direction against the urging force of the springs S3. In this state, the ferrules 11 have moved to positions closer to the base end in the axial direction as much as possible. The ferrules 111 have also moved to positions closer to the base end in the axial direction as much as possible. When the housing 20 is further pushed to the adapter 120, the entire optical connector 10 moves toward the base end in the axial direction against the urging force of the springs S1 as illustrated in FIG. 8. The move of the optical connector 10 toward the base end in the axial direction causes the base end portions 64 of the attachment member 60 to be inserted into the through holes 54 of the partition 50. In FIG. 8, the engagement portion 32 is inserted further into the engagement groove portion 123 as much as possible. This may prevent the connection portion connecting the optical connector 10 to the optical module 110 from becoming wet by water.

As described above, the optical connector 10 is supported such that the optical connector 10 is movable in the axial direction, and is urged toward the connecting end in the axial direction by the springs S1. Thus, when connecting the optical connector 10 to the optical module 110, variations in the length of the optical module 110 in the axial direction depending on the type of the optical module 110 is accommodated, and the optical connector 10 becomes connectible to the optical module 110. Thus, for example, even when the optical module 110 is replaced with an optical module of a different type, the optical connector 10 is connectible to the replacement optical module, while a situation in which the connection portion connecting the optical connector 10 to the optical module becomes wet with water is suppressed using the similar optical connector 10, the housing 20, and the adapter 120. Thus, the present waterproof device has an improved versatility.

As illustrated in FIGS. 7 and 8, the ferrules 11 and 111 contact each other and move in the axial direction. After that, the optical connector 10 moves toward the base end in the axial direction against the urging force of the springs S1. This ensures a state of the ferrules 11 and 111 being in contact with each other. Before the springs S1 are compressed, the springs S2, which urge the ferrules 11, and the springs S3, which urge the ferrules 111, are compressed. With this arrangement, the ferrules 11 and 111 are maintained in a state in which the ferrules 11 and 111 are pressed against each other by the urging force of the springs S2 and S3 even before the springs S1 are compressed. This allows the contacting property of the ferrules 11 and 111 to be maintained.

In detail, a spring constant K1, which is the total spring constant of the two springs S1, is greater than a constant K2, which is the total spring constant of the two springs S2. That is, K1>K2. In other words, the spring constant of the springs that urge the optical connector is greater than the spring constant of the springs that urge the ferrules. Since the housing 20 is provided with the two springs S1 that urge the optical connector 10, the total spring constant of the two springs S1 is given by the following expression:

$$K1 = 2 \times K1'$$

where $K1'$ is the spring constant of each of the springs S1. Since the optical connector 10 is provided with the two springs S2 as illustrated in FIG. 5, the total spring constant of the two springs S2 is given by the following expression:

$$K2 = 2 \times K2'$$

where K2' is the spring constant of each of the springs S2. The spring constant may also be given by $$K2=(0.99 \text{ to } 0.1) \times K1.$$

Figure 9A:
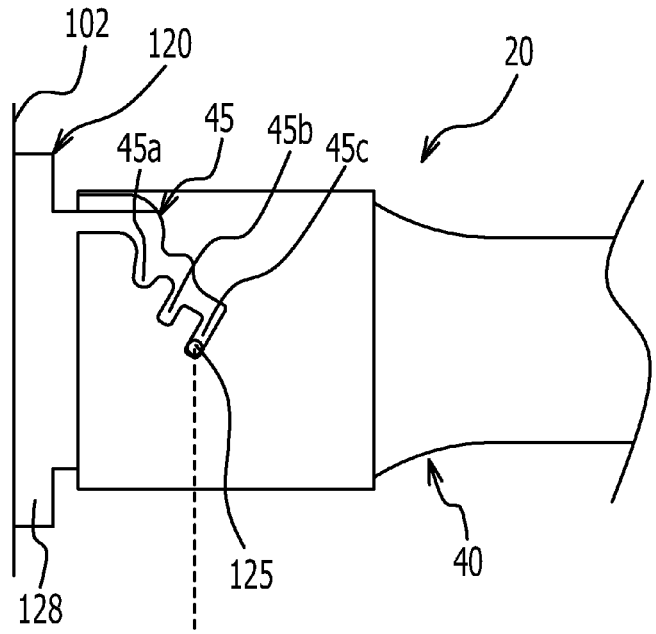
FIGS. 9A and 9B illustrate one of groove portions and a corresponding protrusion portion that lock a housing and an adapter with each other.
Figure 9B:
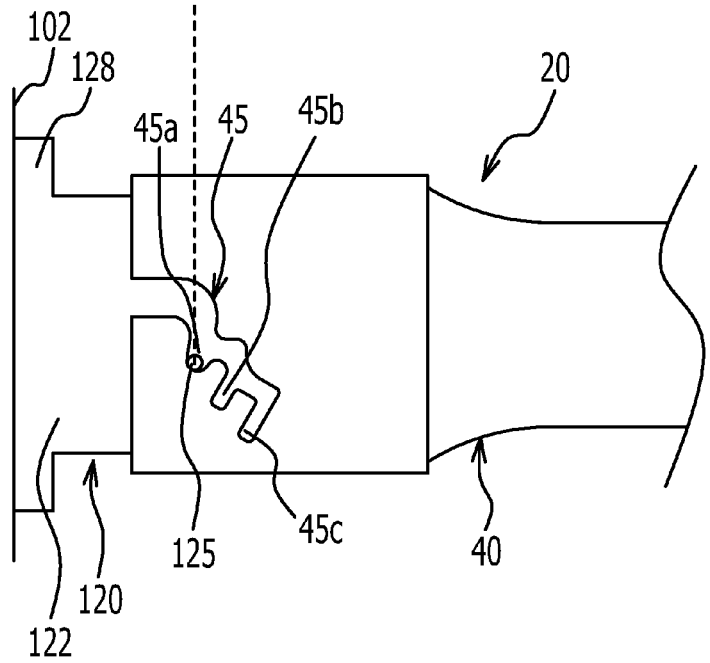

FIGS. 9A and 9B illustrate one of the groove portions 45 and the corresponding protrusion portion 125 that lock the housing 20 and the adapter 120 with each other.

As illustrated in FIG. 9A, the groove portion 45 has a stepped shape. The groove portion 45 has a plurality of lock positions 45a, 45b, and 45c. The protrusion portion 125 is engageable with one of the lock positions 45a, 45b, and 45c. In FIG. 9A, the protrusion portion 125 is engaged with the lock position 45c. In FIG. 9B, the protrusion portion 125 is engaged with the lock position 45a. In FIG. 9A, the housing 20 is locked into the adapter 120 at the deepest position. In FIG. 9B, the housing 20 is locked into the adapter 120 at the shallowest position. As described above, the lock position in the axial direction where the groove portion 45 and the protrusion portion 125 are engaged with each other changes in accordance with the position of the outer cylindrical portion 40 relative to the adapter 120 in the axial direction and in a direction of rotation about the axis direction. Accordingly, by operating the outer cylindrical portion 40, the operator may adjust the lock position of the outer cylindrical portion 40 relative to the adapter 120 in the axial direction. This allows the lock position to be adjusted with consideration of the length of the optical module 110 in the axial direction, which varies depending on the type of the optical module 110.

Figure 10:
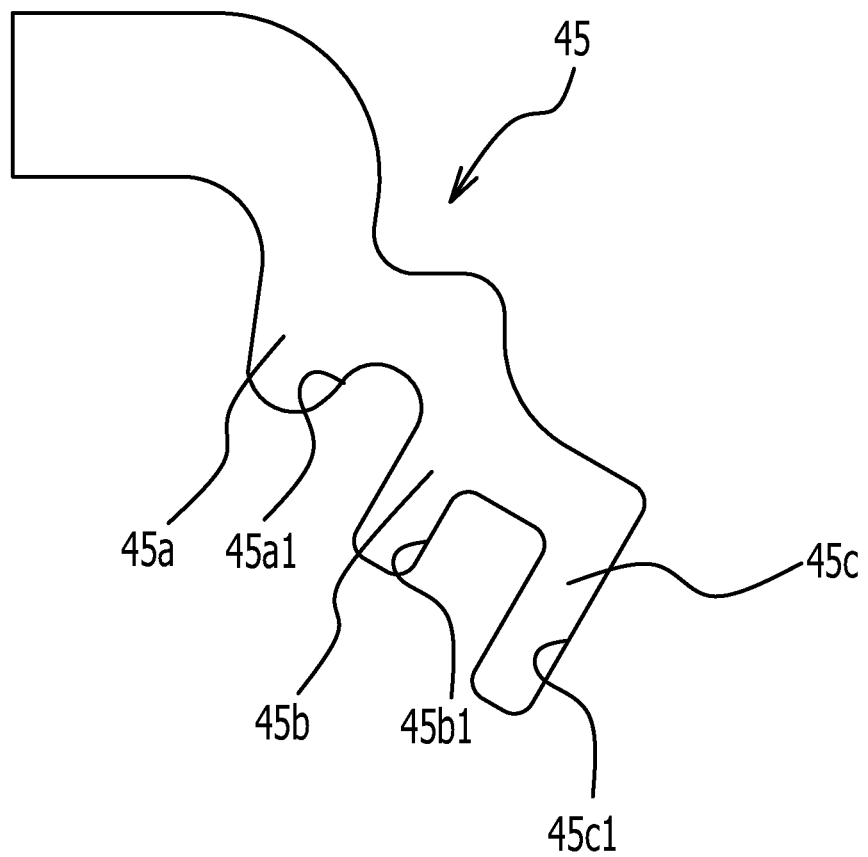
FIG. 10 is an enlarged view of a groove portion.

FIG. 10 is an enlarged view of the groove portion 45.

As illustrated in FIG. 10, side wall portions 45a1, 45b1, and 45c1 of each groove portion 45, which respectively define the lock positions 45a, 45b, and 45c, are formed so as to be inclined relative to the axial direction. For this reason, when the housing 20 is removed while the protrusion portions 125 are engaged with, for example, the lock positions 45c, the outer cylindrical portion 40 is rotated while being pushed toward the connecting end in the axial direction such that the protrusion portions 125 move along the respective side wall portions 45c1. The protrusion portions 125 are typically moved out of the groove portions 45 by operating the outer cylindrical portion 40 so as to move the protrusion portions 125 along the respective groove portions 45. Thus, in order to release the lock, the outer cylindrical portion 40 is typically operated in the axial direction and in the direction of rotation about the axial direction. This prevents the lock from being easily released.

In order to push the outer cylindrical portion 40 toward the connecting end in the axial direction, the outer cylindrical portion 40 may be desirably pushed against the urging force of the springs S1. When the outer cylindrical portion 40 is pushed against the urging force of the springs S1, it is unlikely that the protrusion portions 125 are naturally moved out the groove portions 45. Thus, release of the lock is prevented.

Figure 11A:
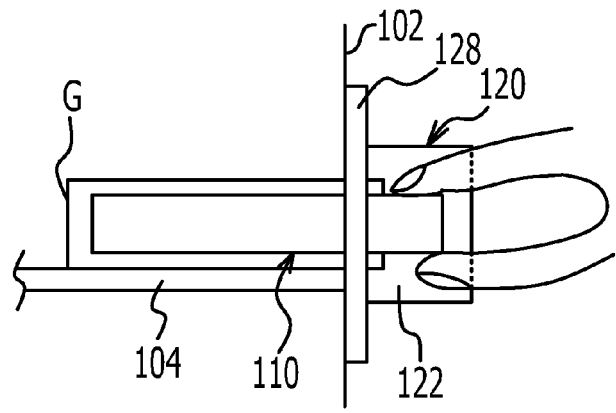
FIGS. 11A, 11B and 11C (11A to 11C) illustrate a replacement operation of an optical module.
Figure 11B:
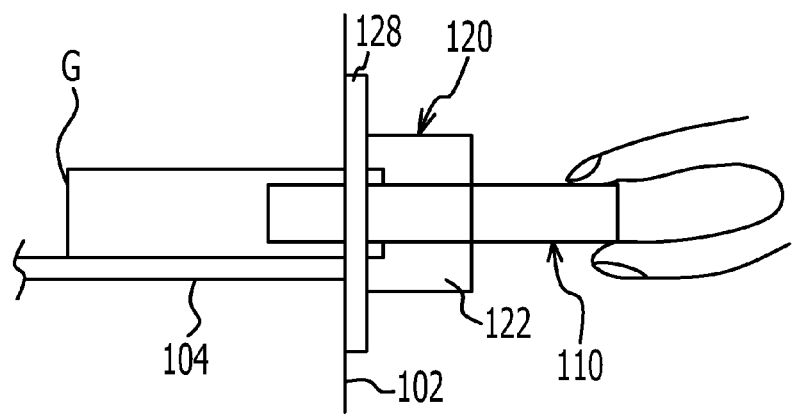
Figure 11C:
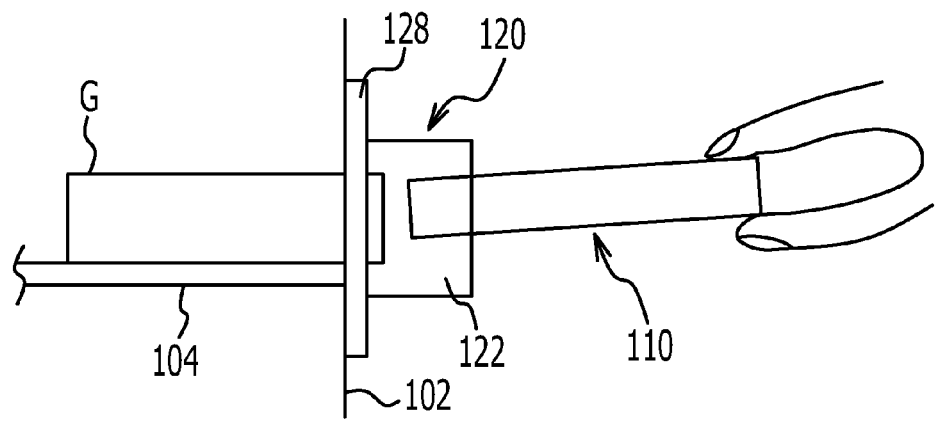

FIGS. 11A to 11C illustrate a replacement operation of the optical module 110.

As illustrated in FIG. 11A, the optical module 110 is engaged with G provided on the printed circuit board 104. The operator inserts her or his hand into the adapter 120 so as to catch the connecting end portion of the optical module 110 and pulls the optical module 110 toward the operator. By doing this, the optical module 110 is moved out of G as illustrated in FIG. 11B and may be removed as illustrated in FIG. 11C. Likewise, instead of the optical module 110, an optical module of a different type may be inserted into the adapter 120 and easily mounted to G.

Here, as illustrated in FIG. 3, assume that the height of the optical module 110 in a direction perpendicular to a direction in which the two insertion holes 112 are arranged is H. Also assume that the distances between the optical module 110 and the inner surface of the engagement portion 122 in the height direction of the optical module 110 are L1 and L2. Each of the distances L1 and L2 is set from 0.2 times H to 4 times H. In consideration of preventing interference of the optical module 110 with other connectors provided adjacent to the optical module 110, each of the distances L1 and L2 may be set to 1.5 times H or smaller. In consideration of the ease of catching the optical module 110, each of the distances L1 and L2 may be set to 0.5 times H or greater. In addition, the distance L1 and the distance L2 may be values different from each other.

Modifications of the waterproof device will be described below.

FIGS. 12A, 12B, 13A, and 13B illustrate a modification of the waterproof device. In the description of the waterproof devices according to the modifications, components similar to those of the above-described waterproof device are denoted by similar signs, thereby omitting duplicated description.

Figure 12A:
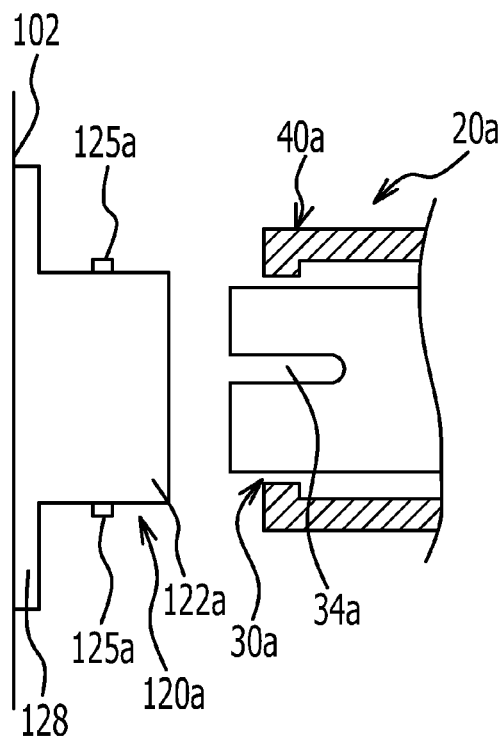
FIGS. 12A and 12B illustrate a modification of a waterproof device.
Figure 12B:
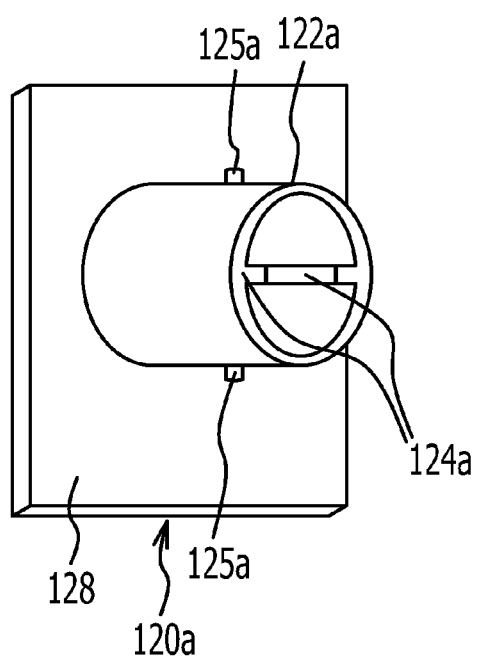

As illustrated in FIG. 12A, a cylindrical portion 30a has guide portions 34a extending in the axial direction on the connecting end side. The guide portions 34a are groove-shaped cutouts. As illustrated in FIG. 12B, an engagement portion 122a has two guide portions 124a formed therein. The guide portions 124a are formed so as to protrude from the inner surface of the engagement portion 122a and extend in the axial direction. As illustrated FIG. 13B, the cylindrical portion 30a has the two guide portion 34a formed therein. In order to engage a housing 20a with an adapter 120a, it is desirable that the guide portions 124a are inserted into the guide portions 34a, and after that, the cylindrical portion 30a is inserted into the engagement portion 122a. Thus, the guide portions 34a and 124a have a function of determining the position at which the housing 20a and the adapter 120a are engageable with each other in the direction of rotation about the axial direction.

Figure 13A:
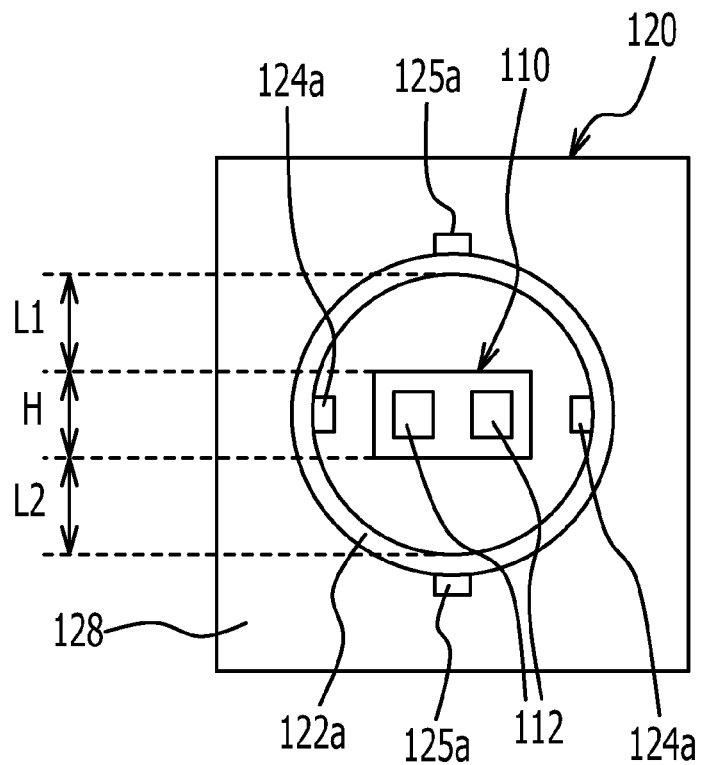
FIG. 13A is a front view of an adapter of a modification of a waterproof device.
Figure 13B:
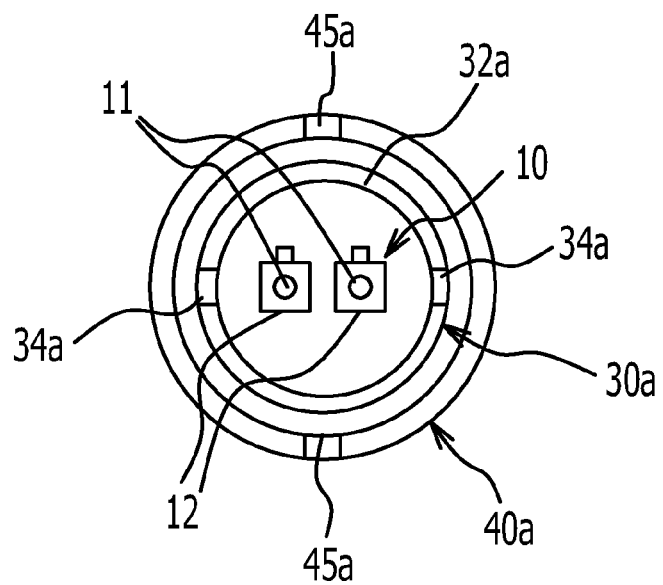
FIG. 13B is a front view of a housing of a modification of a waterproof device.

As illustrated in FIG. 13A, the two guide portions 124a are disposed such that the guide portions 124a are aligned with the two insertion holes 112 of the optical module 110. In detail, the two guide portions 124a are disposed on a line that passes through the central axes of the two insertion holes 112. The optical module 110 is disposed on this line at a substantially central position between the two guide portions 124a. Likewise, as illustrated in FIG. 13B, the two guide portions 34a are disposed such that the guide portions 34a are aligned with the two ferrules 11. In detail, the two guide portions 34a are disposed on a line that passes through the two ferrules 11. The optical connector 10 is disposed on this line at a substantially central position between the two guide portions 34a. With this arrangement, when the cylindrical portion 30a is inserted into the engagement portion 122a with the guide portions 34a and 124a engaged with each other, the two main body portions 12 are insertable into the respective two insertion holes 112. Thus, the guide portions 124a and 34a also have a function of guiding the insertion of the main body portions 12 into the insertion holes 112.

Figure 14:
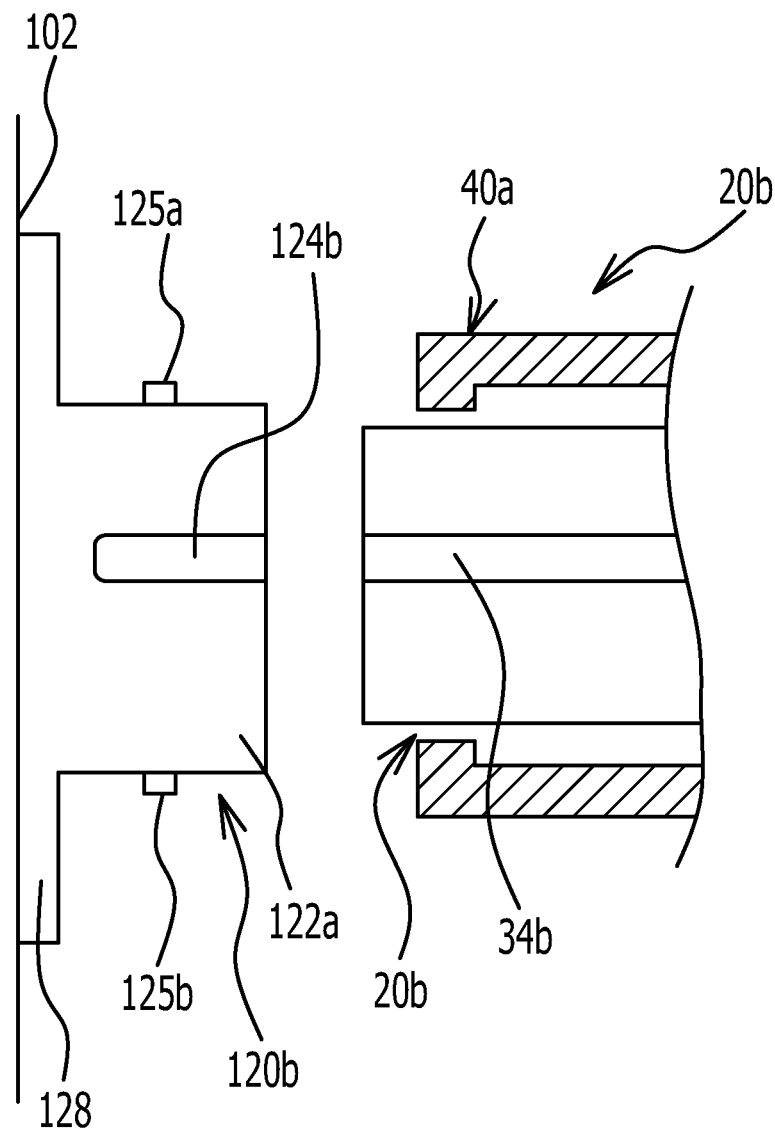
FIG. 14 illustrates another modification of a waterproof device.

FIG. 14 illustrates a second modification of the waterproof device.

An engagement portion 122b has two guide portions 124b that extend in the axial direction. The guide portions 124b are groove-shaped cutouts. A cylindrical portion 30b has two guide portions 34b that extend in the axial direction. The guide portions 34b protrude from the outer surface of the cylindrical portion 30b. Thus, by engaging the guide portions 34b with the guide portions 124b, the position at which a housing 20b and an adapter 120b are engageable with each other is determined in the direction of rotation about the axial direction. As described above, cutout-shaped guide portions may be formed on the adapter 120b side, and the protruding guide portions may be formed on the housing 20b side.

Figure 15A:
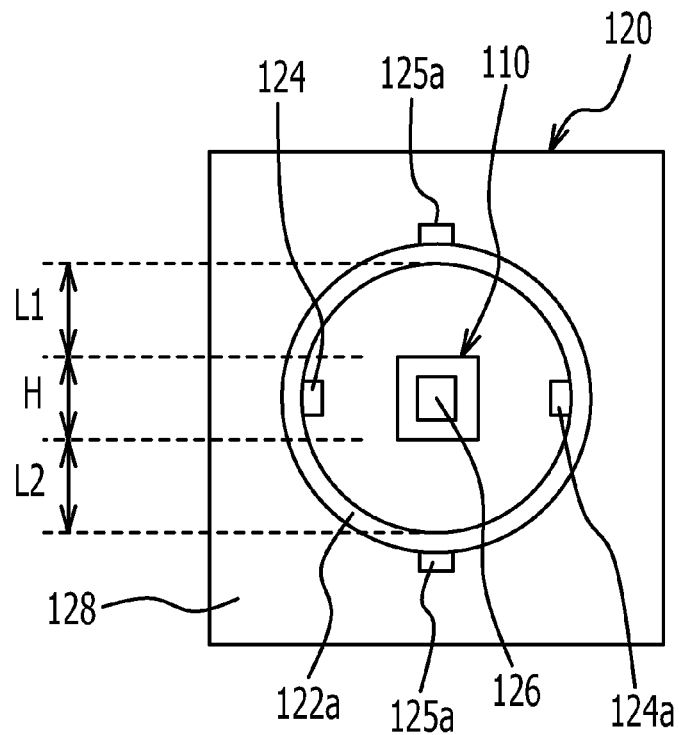
FIG. 15A is a front view of an adapter of a modification of a waterproof device.
Figure 15B:
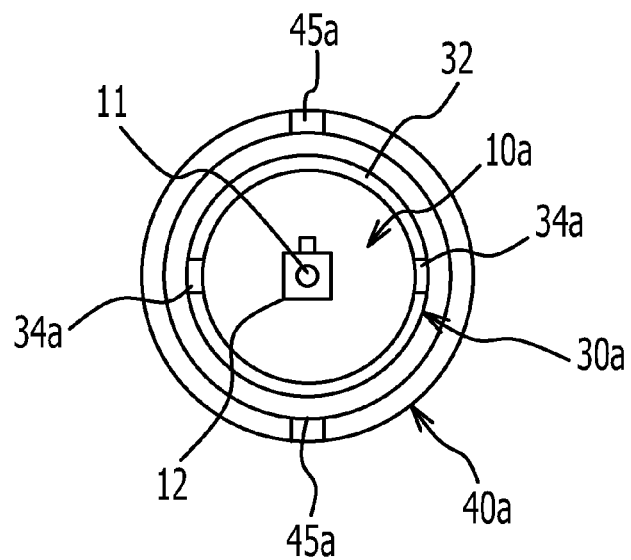
FIG. 15B is a front view of a housing of a modification of a waterproof device.

FIGS. 15A and 15B illustrate a third modification of the waterproof device.

FIG. 15A is a front view of an adapter 120c. FIG. 15B is a front view of a housing 20c. As illustrated in FIGS. 15A and 15B, the adapter 120c and the housing 20c respectively hold an optical module 110a and an optical connector 10a. The optical connector 10a is a simplex optical connector. The optical module 110a is an optical module to which a simplex optical connector is connectible. Such a connection portion connecting the simplex optical connector 10a to the optical module 110a may be made waterproof. In this arrangement, a single attachment member may be attached to the optical connector 10a. Also, the attachment member may be urged by the single spring S1. The spring constant K1 of the single spring S1 that urges the optical connector 10a is greater than the spring constant K2 of the spring S2 that urges the ferrule 11 of the simplex optical connector 10a. Thus, when connecting the optical connector 10a to the optical module 110a, the spring S1 is compressed after the spring S2 of the optical connector 10a is compressed.

Figure 16:
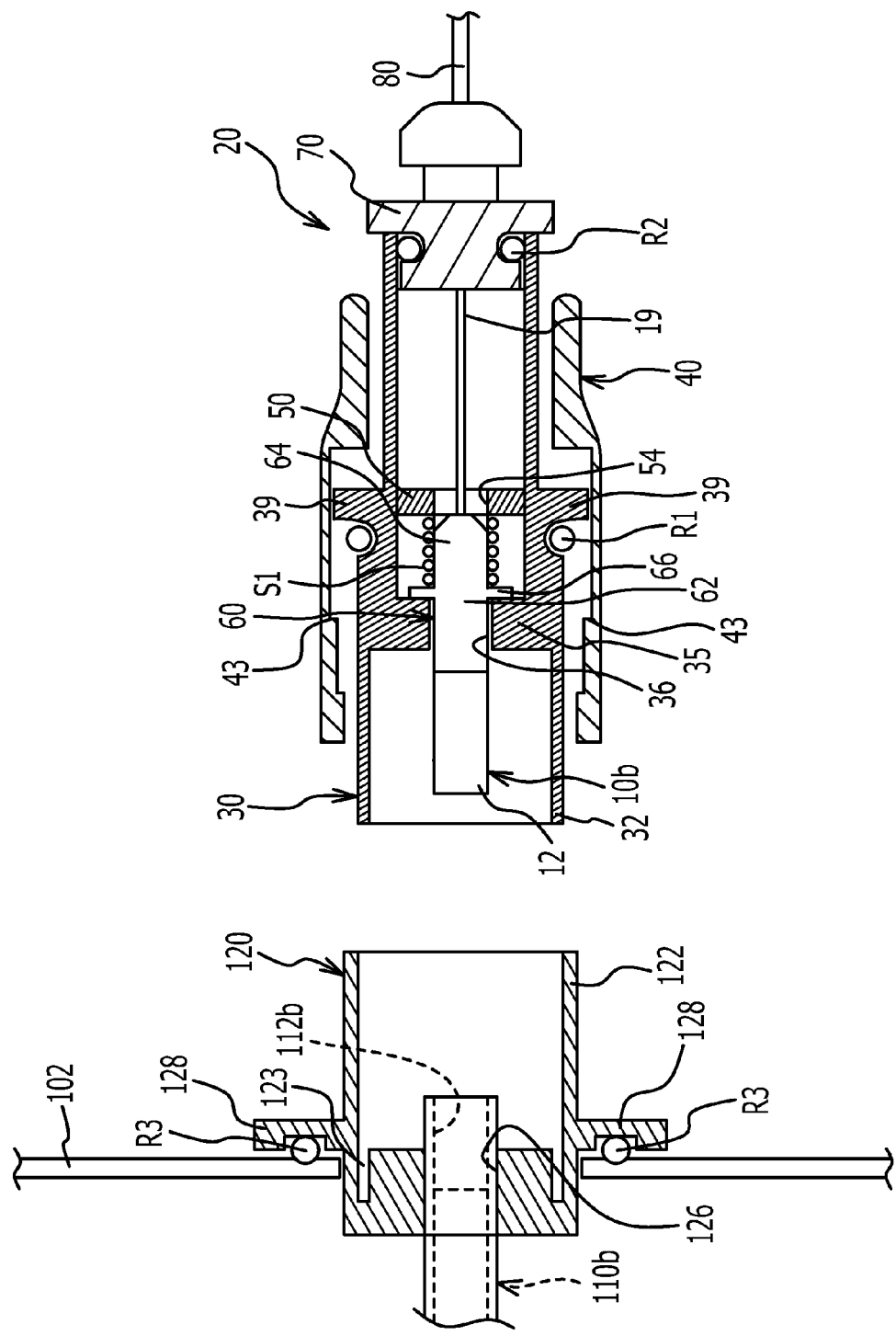
FIG. 16 illustrates a waterproof device applied to an electrical connector.

FIG. 16 illustrated the waterproof device applied to an electrical connector.

As illustrated in FIG. 16 as an example, the housing 20 holds an electrical connector 10b instead of an optical connector, and the adapter 120 holds an electrical connector 110b instead of an optical module. Thus, the present waterproof device is applicable not only to an optical connection but also to an electrical connection performed by an electrical connector. The electrical connectors 10b and 110b may be of, for example, respectively a male-type electrical connector and a female-type electrical connector. The types of the electrical connectors 10b and 110b may be inverted.

Although the preferred embodiment according to the present invention has been described above, the present invention is not limited to the specific embodiment. A variety of modifications and changes may be implemented without departing from the scope of an aspect of the present invention.

In the above described embodiment, the optical module is described as an example of the connection target to which the optical connector is connectible. However, the present waterproof device may be applicable to a connection that connects optical connectors to each other. When connecting optical connectors to each other, the housing 20 and the adapter 120 hold respective optical connectors.

In the above-described embodiment, an example in which the attachment member 60 having the flange portion 66 is attached to the optical connector 10 is illustrated. However, the configuration of the attachment member 60 is not limited to this. For example, a frame-shaped flange member that serves as the flange portion may be engaged with the boot 18 portions of the optical connector 10. When the flange member is used, the flange member has a size sufficient to block the insertion thereof into the through hole 36, and sufficient to hold the springs S1 between the flange member and the partition 50 such that the springs S1 are compressible.

The above-described embodiment has been mainly described with an example in which the duplex optical connector is used. The duplex optical connector may be urged by the single spring. When the duplex optical connector is urged by the single spring, the spring constant K1 of the single spring that urges the optical connector is greater than the total spring constant K2 of the two springs that are provided in the duplex optical connector. Here, when the spring constant of each of the springs that are provided in the duplex optical connector is K2', the magnitude relationship between the constants is given by the following expression:

$$K1 > K2 = 2 \times K2'.$$

In the above-described embodiment, the waterproof device having a connection structure for which waterproofness is considered is described as an example. However, the present connection structure may be a structure without consideration of waterproofness. For example, the present connection structure may be a structure with consideration of dustproof properties or the like. Alternatively, the present connection structure may be a structure without consideration of waterproof or dustproof properties.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments of the present inventions has been described in detail, it should be understood that various changes, substitutions, and alterations could be made hereto without departing from the spirit and scope of the invention, the scope of which is defined in the claims and their equivalents.

What is claimed is:

1. A connection device, comprising:
    an adapter that covers a connection target to which a connector is to be connected, the adapter being secured to a connection apparatus that is provided with the connection target; and
    a housing that includes:
        a cylindrical portion that holds the connector such that the connector is movable relative to the adapter in an axial direction, the cylindrical portion being engaged with the adapter such that the connector is connected with the connection target, and
        a first spring that urges the connector toward the connection target.

2. The connection device according to claim 1, wherein the housing is provided with an outer cylindrical portion that is rotatable relative to the adapter about the axial direction, and
    wherein the outer cylindrical portion and the adapter are lockable with each other, the outer cylindrical portion and the adapter have respective engagement portions in which a lock position of the outer cylindrical portion with the adapter in the axial direction changes in accordance with a position of the outer cylindrical portion relative to the adapter in the axial direction and in a direction of rotation about the axial direction.

3. The connection device according to claim 2, wherein one of the engagement portions of the outer cylindrical portion and the adapter is a protrusion portion, and the other one of the engagement portions of the outer cylindrical portion and the adapter is a groove portion, and
    the groove portion is engageable with the protrusion portion and extending so as to form a stepped shape.

4. The connection device according to claim 1, wherein the adapter and the cylindrical portion have respective guide portions that determine an engagement position at which the adapter and the cylindrical portion are engageable with each other.

5. The connection device according to claim 1, wherein the connector is provided with a ferrule and a second spring that urges the ferrule toward a connecting end in the axial direction.

6. The connection device according to claim 5, wherein, when the connector is connected with the connection target, the connector moves against urging force of the first spring after the ferrule has moved against urging force of the second spring.

7. The connection device according to claim 1, wherein the cylindrical portion has an engagement portion at a connecting end portion, and the connector is formed to be movable relative to a support portion of the engagement portion of the cylindrical portion in the axial direction.

8. A method for the manufacture of a connection device, comprising:

forming an adapter covering a connection target to which a connector is to be connected, the adapter being secured to a connection apparatus that is provided with the connection target; and forming a housing including:

forming a cylindrical portion that holds the connector in a moveable manner relative to the adapter in an axial direction, the cylindrical portion being engaged with the adapter to cause the connector to be connected with the connection target; and forming a spring that urges the connector toward the connection target.

* * * * *